United States Patent
Plank et al.

(10) Patent No.: US 11,067,675 B2
(45) Date of Patent: Jul. 20, 2021

(54) TIME OF FLIGHT IMAGING APPARATUSES AND A METHOD FOR ADJUSTING A REFERENCE FREQUENCY

(71) Applicant: Infineon Technologies AG, Neubiberg (DE)

(72) Inventors: Hannes Plank, Graz (AT); Norbert Druml, Graz (AT); Armin Schoenlieb, Seiersberg-Pirka (AT)

(73) Assignee: Infineon Technologies AG

( * ) Notice: Subject to any disclaimer, the term of this patent is extended or adjusted under 35 U.S.C. 154(b) by 783 days.

(21) Appl. No.: 15/909,163

(22) Filed: Mar. 1, 2018

(65) Prior Publication Data
US 2018/0259628 A1 Sep. 13, 2018

(30) Foreign Application Priority Data
Mar. 10, 2017 (DE) ...................... 10 2017 105 142.2

(51) Int. Cl.
| | | |
|---|---|---|
| *G01S 7/486* | (2020.01) | |
| *G01S 17/89* | (2020.01) | |
| *G01S 7/4865* | (2020.01) | |
| *G01S 17/36* | (2006.01) | |
| *G01S 7/4863* | (2020.01) | |

(Continued)

(52) U.S. Cl.
CPC .......... *G01S 7/4865* (2013.01); *G01S 7/4863* (2013.01); *G01S 7/497* (2013.01); *G01S 17/36* (2013.01); *G01S 17/894* (2020.01)

(58) Field of Classification Search
CPC ...... G01S 7/4865; G01S 17/36; G01S 7/4863; G01S 7/497; G01S 17/894

USPC ........................................................ 356/5.01
See application file for complete search history.

(56) References Cited

U.S. PATENT DOCUMENTS

| | | | |
|---|---|---|---|
| 7,053,357 B2 | 5/2006 | Schwarte | |
| 7,924,411 B2 | 4/2011 | Lamesch | |
| 9,430,822 B2 | 8/2016 | Irschara et al. | |

(Continued)

FOREIGN PATENT DOCUMENTS

| | | |
|---|---|---|
| CN | 101142822 A | 3/2008 |
| CN | 103412299 A | 11/2013 |

(Continued)

OTHER PUBLICATIONS

Schneider, Bernd: Der Photomischdetektor zur schnellen 3D-Vermessung für Sicherheitssysteme und zur Informationsü bertragung im Automobil. Siegen, 2003. XIV, 171 S.—Siegen, Univ., Diss., 2003, pp. i-xiv, 1-36, abstract only in English.

*Primary Examiner* — Daniel L Murphy
(74) *Attorney, Agent, or Firm* — Design IP

(57) ABSTRACT

A time of flight imaging apparatus includes a plurality of sensor pixels configured to receive an external light signal modulated with an external modulation frequency. The time of flight imaging apparatus further includes pixel circuitry configured to generate a sensor pixels output signal based on the external light signal and a reference signal having a reference frequency. The sensor pixels output signal has a frequency depending on a difference between the external modulation frequency and the reference frequency. The time of flight imaging apparatus further includes synchronization circuitry configured to adjust the reference frequency of the reference signal based on the sensor pixels output signal.

20 Claims, 7 Drawing Sheets

(51) Int. Cl.
G01S 7/497 (2006.01)
G01S 17/894 (2020.01)

(56) References Cited

U.S. PATENT DOCUMENTS

| | | |
|---|---|---|
| 9,720,076 B2 | 8/2017 | Guo et al. |
| 9,900,581 B2 * | 2/2018 | Gruenwald ............. G01S 17/36 |
| 2015/0204970 A1 | 7/2015 | Jeong et al. |

FOREIGN PATENT DOCUMENTS

| | | |
|---|---|---|
| CN | 105763788 A | 7/2016 |
| CN | 105378506 A | 1/2018 |
| DE | 19704496 A1 | 3/1998 |
| DE | 10 2015 015 898 A1 | 6/2016 |

* cited by examiner

TIME OF FLIGHT IMAGING APPARATUSES AND A METHOD FOR ADJUSTING A REFERENCE FREQUENCY

FIELD

The present disclosure relates to time of flight systems, and, in particular, to time of flight imaging apparatuses and to a method for adjusting a reference frequency.

BACKGROUND

Time of flight (TOF) systems may be used to generate three-dimensional (3D) images. Generally, a TOF imaging apparatus may receive light emitted by the TOF imaging apparatus and reflected by an object. Based on the received reflected light, the TOF imaging apparatus may determine depth information related to the object and/or generate a 3D image of the object based on the received reflected light and an internal reference signal.

SUMMARY

It is a demand to provide time of flight imaging apparatuses with communication capabilities.

Such a demand may be satisfied by the subject matter of the claims.

Some embodiments relate to a time of flight imaging apparatus. The time of flight imaging apparatus includes a plurality of sensor pixels configured to receive an external light signal modulated with an external modulation frequency. The time of flight imaging apparatus further includes pixel circuitry configured to generate a sensor pixels output signal based on the external light signal and a reference signal having a reference frequency. The sensor pixels output signal has a frequency depending on a difference between the external modulation frequency and the reference frequency. The time of flight imaging apparatus further includes synchronization circuitry configured to adjust the reference frequency of the reference signal based on the sensor pixels output signal.

Some embodiments relate to a time of flight imaging apparatus comprising at least one sensor pixel configured to receive a modulated light signal. The time of flight imaging apparatus further includes pixel circuitry configured to generate a sensor pixels output signal based on a demodulation of the modulated light signal utilizing a reference signal. The time of flight imaging apparatus further includes synchronization circuitry configured to generate the reference signal having an adjusted reference frequency based on the sensor pixels output signal.

Some embodiments relate to a method for adjusting a reference frequency. The method includes receiving, by a plurality of sensor pixels, an external light signal modulated with an external modulation frequency. The method further includes generating, by pixel circuitry, a sensor pixels output signal based on the external light signal and a reference signal having a reference frequency, wherein the sensor pixels output signal has a frequency depending on a difference between the external modulation frequency and the reference frequency. The method further includes adjusting, by synchronization circuitry, the reference frequency of the reference signal based on the sensor pixels output signal.

BRIEF DESCRIPTION OF THE DRAWINGS

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
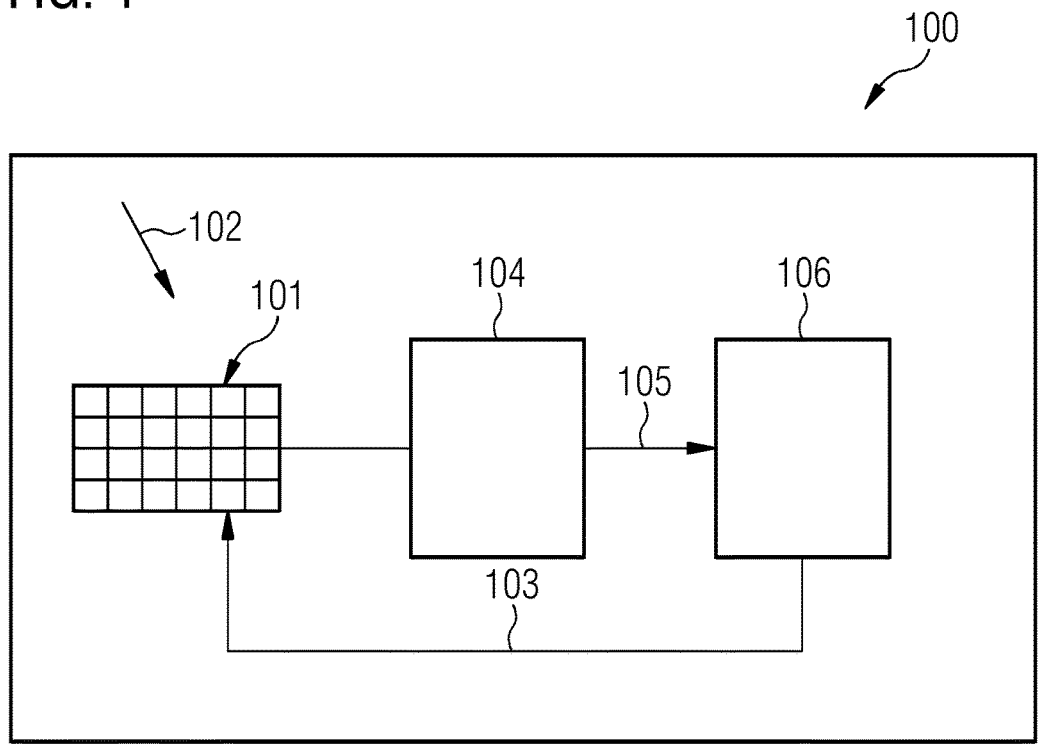
FIG. 1 shows a schematic illustration of a Time of Flight imaging apparatus.

FIG. 1 shows a schematic illustration of a time of flight imaging apparatus 100.

The time of flight imaging apparatus 100 includes a plurality of sensor pixels 101 configured to receive an external light signal 102 modulated with an external modulation frequency.

The time of flight imaging apparatus 100 further includes pixel circuitry 104 configured to generate a sensor pixels output signal 105 based on the external light signal 102 and a reference signal 103 having a reference frequency. The sensor pixels output signal 105 has a frequency depending on a difference between the external modulation frequency and the reference frequency.

The time of flight imaging apparatus 100 further includes synchronization circuitry 106 configured to adjust the reference frequency of the reference signal 103 based on the sensor pixels output signal 105.

Due to the time of flight (TOF) imaging apparatus 100 comprising synchronization circuitry 106 for adjusting the reference frequency of the reference signal 103, the TOF imaging apparatus 100 may adjust or adapt its own reference frequency 103 to the external modulation frequency of an external light signal 102 from an external device. This may lead to communication (e.g. the transfer of load data) between the TOF imaging apparatus 100 and an external device being more accurate due to improved synchronization between the reference frequency of the TOF imaging apparatus 100 and the external modulation frequency. Load data information in data signals received by the TOF imaging apparatus 100 may thus be decoded more accurately by the TOF imaging apparatus 100 as the number of ambiguous phase values during decoding may be reduced.

It may be that communication may wish to be established between a first TOF imaging apparatus 100 and a second imaging apparatus. For example, a second imaging apparatus may wish to send a signal comprising load data (e.g. phase shift key PSK modulated information) to the first imaging apparatus 100. However, there is usually a frequency offset between the modulation signals due to frequency imprecision of the oscillators. If the reference frequency of the first TOF imaging apparatus 100 is not synchronized with the external modulation frequency of the second TOF imaging apparatus (e.g. frequency imprecision exists), then ambiguous phase values may lead to an inaccurate decoding of the received load data by the first imaging apparatus 100. However, since the first TOF imaging apparatus 100 is able to adjust its reference frequency to the external modulation frequency of the second TOF imaging apparatus, the first TOF imaging apparatus 100 may be able to decode the received load data more accurately.

The TOF imaging apparatus 100 may include (or may be) an imaging device, a device which may be configured to determine distance information related to an object, and/or a device which may be configured to generate a three-dimensional image of an object. For example, the TOF imaging apparatus 100 may be a camera, such as a time of flight (TOF) camera.

The external light signal 102 may be received by the plurality of pixels 101 during a synchronization process for adjusting the reference frequency of the reference signal 103 to the external modulation frequency. The external light signal 102 received by the (first) TOF imaging apparatus 100 (e.g. by the plurality of pixels 101 of the TOF imaging apparatus 100) may be a light signal emitted by an external light source, a light signal emitted by an external (or second) time of flight imaging apparatus, and/or a light signal emitted by an external light source and reflected by an object. For example, the external light signal 102 may be received by the plurality of pixels 101 over (or through) air.

The external light signal 102 may be a pulsed light signal, Plight. For example, the external light signal 102 may be modulated with the external modulation frequency. For example, the external light signal may be transmitted (from an external device) in pulses at the external modulation frequency. The external light signal 102 is not phase-shift keying modulated. For example, the external light signal 102 received by the plurality of sensor pixels 101 may be a fixed (e.g. constant) phase signal. For example, the external light signal 102 may have a constant phase. The external light signal 102 may include or may be an infra-red electromagnetic (EM) wave signal (e.g. infra-red light) or a visible electromagnetic wave (e.g. visible light). Infra-red EM waves may have a wavelength which lies between 700 nm and 1 mm and visible EM waves may have a wavelength which lies between 500 nm and 700 mm.

The external light signal 102 may be received from the external device (e.g. an external light source, or e.g. a second TOF imaging apparatus) which is not physically connected to the TOF imaging apparatus 100 by electrical wires. The external device may be electrically isolated from the TOF imaging apparatus 100, and/or no additional electrical signals may be transferred between them. Optionally, the external device and the TOF imaging apparatus 100 may be connected to a common ground.

The circuits of the external device responsible for transmitting (or which are configured to transmit) the external light signal having the external modulation frequency are not physically connected to the synchronization circuitry of the TOF imaging apparatus 100, for example. Thus, the external light signal 102 may be modulated with the external modulation frequency which is independent from (e.g. not based on) the reference signal. For example, the external light signal 102 may be generated independently from the synchronization circuitry 106 of the TOF imaging apparatus 100. For example, the synchronization circuitry 106 of the TOF imaging apparatus 100 does not influence the external modulation frequency of the external light signal 102 received by the TOF imaging apparatus 100. The external modulation frequency may be different from the reference frequency of the TOF imaging apparatus 100 due to frequency imprecision of the oscillators.

The plurality of sensor pixels 101 may be part of (or may be) a two-dimensional sensor pixel array. A (or each) sensor pixel 101 of the plurality of sensor pixels 101 may be (or may be referred to as) a photonic mixing device (PMD) pixel. Optionally, a (or each) sensor pixel 101 of the plurality of sensor pixels 101 may include at least part of the pixel circuitry 104. The pixel circuitry 104 of each sensor pixel 101 may be configured as a photonic mixing device (PMD) circuit. For example, each sensor pixel 101 may include a photodetector circuit for the detection of incoming EM waves. The PMD circuitry of the pixel circuitry 104 may be configured such that the pixel circuitry 104 may derive the sensor signal based on the incoming external light signal 102 received by the sensor pixel 101. For example, the pixel circuitry 104 may be configured to generate the sensor signal based on a demodulation of the external light signal utilizing the reference signal 103.

Each sensor pixel (e.g. PMD pixel) may include transparent charge collecting photogates, e.g. a plurality of photogates. Each photogate may include a generation zone, e.g. a photosensitive region, such as a depletion region or space charge region, where photogenerated charge carriers may be generated by a received light signal (e.g. such as the external light signal having the fixed phase and/or other light signals having varying phases). The photogenerated charge carriers may include positive charge-carriers, e.g. holes, or negative charge-carriers, e.g. electrons. The number of photogenerated charge carriers generated in the generation zone may be proportional to the intensity of the light signal received by the photogate when the photogate is biased by the applied biasing signal.

The operation of the plurality of sensor pixels 101 may be controlled at least partially by the reference signal 103. For example, in the multiple photogate sensor pixel, a plurality of biasing signals having different phase offsets may be applied to the photogates of the sensor pixel. The plurality of biasing signals may be derived based on the reference signal 103.

A two-photogate sensor pixel may have a first photogate and a second photogate. Each photogate in the sensor pixel may be biased by a biasing signal having a different phase offset with respect to the reference signal 103. For example, a first biasing signal (Mod-A) may be applied to the first photogate, and a second biasing signal may be applied to the second photogate. The first biasing signal, which may be derived based on the reference signal 103, may bias or toggle a first photogate of a sensor pixel at a biasing frequency. The biasing frequency may be based on or equal to or a multiple of the frequency of the reference signal 103. The second biasing signal (Mod-B), which may be derived based on the reference signal 103, may bias or toggle a second photogate of a sensor pixel at a biasing frequency. The second biasing signal may have the same biasing frequency as the first biasing signal. However, the second biasing signal may be out of phase with (e.g. 180° out of phase with, e.g. the inverse of) the first biasing signal. Thus, the first biasing signal and the second biasing signal may control the first photogate and the second photogate of the sensor circuit such that the first photogate and the second photogate are alternatingly switched on or off. For example, the first photogate may be switched to an off-state when the second photogate is switched to an on-state and vice versa.

When the light signal enters (or is incident on) the photogates, electron-hole pairs may be generated in the generation zone. Depending on the biasing signals applied to the first photogate and the second photogate, a potential gradient may be created, which may cause electrons to drift towards a first direction (e.g. from left to right) and be collected in a first charge well or towards a second direction (e.g. from right to left) and be collected in a second charge well. Read-out diodes may provide information related to the charges accumulated in the corresponding wells. For example, a first read-out diode in proximity to the first charge well may provide a first read-out signal related to the number of electrons collected in the first charge well. Additionally, a second read-out diode in proximity to the second charge well may provide a second read-out signal related to the number of electrons collected in the second charge well.

The pixel circuitry 104 may be configured to generate a sensor signal corresponding to each sensor pixel 101 of the plurality of sensor pixels 101 based on the first read-out signal (Ua) and the second read-out signal (Ub) of the sensor pixel 101. For example, the pixel circuitry 104 may be configured to derive the sensor signal based on the first read-out signal from the first photogate of the sensor pixel 101 and the second read-out signal from the second photogate of the (same) sensor pixel 101. The first read-out signal may include voltage values or current values proportional to the number of photogenerated charge carriers generated in the region of the sensor pixel controlled (or controllable) by the first photogate while receiving the external light signal 102. The second read-out signal may include voltage values or current values proportional to the number of photogenerated charge carriers generated in a region of the sensor pixel controlled (or controllable) by the second photogate while receiving the external light signal 102.

The pixel circuitry 104 may be configured to derive (and/or generate) a phase information value of the sensor signal based on a difference (or e.g. a differential, or e.g. a subtraction) between the first read-out signal and the second read-out signal. Each phase information value of the sensor signal may include information related to a phase offset between the external light signal 102 and the reference signal 103. Each phase information value of the sensor signal may be derived based on a subtraction between Ua and Ub (e.g. Ua-Ub). The pixel circuitry 104 may be configured to derive the sensor signal by calculating a plurality of phase information values (e.g. more than 100 phase information values, or e.g. more than 1000 phase information values) during the synchronization process (period).

The pixel circuitry 104 may be configured to derive a sensor signal corresponding to each sensor pixel. The sensor pixels of the plurality of sensor pixels 101 may be configured to operate in parallel (e.g. concurrently). For example, the biasing signals may be applied to each sensor pixel of the plurality of sensor pixels 101 concurrently. Thus, the pixel circuitry 104 may be configured to generate a plurality of sensor signals of a plurality of sensor pixels 101 in parallel (e.g. concurrently).

The pixel circuitry 104 may be configured to generate the sensor pixels output signal 105 based on the external light signal and the reference signal by at least one sensor pixel 101 of the plurality of sensor pixels 101. Optionally, the pixel circuitry 104 may further be configured to generate the sensor pixels output signal 105 based on a plurality of sensor signals from the plurality sensor pixels 101. Optionally, the pixel circuitry 104 may be configured to derive the sensor pixels output signal based on phase information (e.g. sensor signals) derived from all the sensor pixels of the plurality of sensor pixels 101. Optionally or alternatively, the pixel circuitry 104 may be configured to derive the sensor pixels output signal based on phase information (e.g. the sensor signals) derived from a sub-group of sensor pixels of the plurality of sensor pixels. For example, the sub-group of sensor pixels is a two-dimensional array of sensor pixels including less than 50% (or e.g. less than 30%) of the total number of sensor pixels of the plurality of sensor pixels. The sub-group of sensor pixels may be a two-dimensional array of sensor pixels receiving the highest total light intensity from the external light signal 102. Optionally, alternatively, or additionally, the pixel circuitry 104 may be configured to derive the sensor pixels output signal based on phase information (e.g. sensor signals) derived from the sensor pixels of the plurality of sensor pixels receiving the highest light intensity from the external light signal 102.

The pixel circuitry 104 may derive the sensor pixels output signal 105 based on an average of the sensor signals generated by the sensor pixels (e.g. the sub-group of sensor pixels, or e.g. all the sensor pixels) of the plurality of sensor pixels 101. For example, as demonstrated by Equation (1), a sample p of the sensor pixels output signal may be produced by average N phase values pi,j containing a signal. Z may be a value (e.g. an experimentally determined value) used to classify these pixels from the ones containing just background noise.

$$p = \frac{1}{N} \sum_{i=u}^{u+n} \sum_{j=v}^{v+m} \begin{cases} p_{i,j}, & \text{if } |p_{i,j}| \geq Z \\ 0, & \text{otherwise} \end{cases} \quad \text{Equation (1)}$$

The sensor pixels output signal may include output values related to a phase offset between the external light signal 102 and the reference signal 103. The sensor pixels output signal 105 may have a non-vanishing frequency (non-zero frequency) if the reference frequency is different to the external modulation frequency. For example, the sensor pixels output signal 105 may have a frequency depending on a difference between the external modulation frequency and the reference frequency. For example, if a frequency offset (or frequency difference) between the external modulation frequency and the reference frequency is larger than a threshold (e.g. larger than zero), the measured phase values between the external light signal and the reference signal may change with respect to time. For example, the sensor pixels output signal 105 may be a periodic signal (e.g. a triangular periodic signal) having a frequency (see FIG. 2).

It may be understood that although examples described herein relate to the external light signal 102 being a constant phase signal, it may be possible that an external light signal with a plurality of different phase shifts may be used for synchronization. If the TOF imaging apparatus 100 receives an external light signal having different phase shifts, the pixel circuitry 104 may be configured to apply processing to derive the sensor signal for each sensor pixel. For example, the pixel circuitry may apply methods to extract the frequency offset (difference) even if the external light signal has different phase shifts (see FIGS. 4D and 4E).

The synchronization circuitry 106 may be configured to adjust the reference frequency of the reference signal 103 based on the sensor pixels output signal 105. For example, the synchronization circuitry 106 may be configured to derive a frequency offset related to the difference between the external modulation frequency and the reference frequency based on the frequency of the sensor pixels output signal 105. The synchronization circuitry 106 may be configured to derive the frequency offset by sampling the sensor pixels output signal 105 with a sampling frequency to determine the frequency of the sensor pixels output signal 105. The synchronization circuitry 106 may be configured to derive the frequency offset as a digital value and may be made available to control circuitry (or e.g. a processing system) of the TOF imaging apparatus 100. This may enable further applications, such as adjusting the phase locked loops of different communication partners or avoiding interference with other TOF systems while depth sensing.

The synchronization circuitry 106 may be configured to adjust the reference frequency of the reference signal 103 based on the derived frequency offset. For example, the synchronization circuitry 106 may be configured to adjust the reference frequency of the reference signal 103 so that the frequency of the sensor pixels output signal falls below a threshold. The threshold may be less than 10 Hz (or e.g. less than 5 Hz, or e.g. less than 2 Hz, or e.g. zero Hz). The synchronization circuitry 106 may be configured to adjust the reference frequency of the reference signal until the reference frequency of the reference signal is equal to the external reference frequency and/or until a frequency offset between the reference frequency and the external reference frequency falls below the threshold. For example, the synchronization circuitry 106 of the TOF imaging apparatus 100 may tune or adapt its modulation clock to the modulation clock of the external illumination source (and/or external TOF imaging apparatus) sending the external light signal 102.

The synchronization circuitry 106 may be configured to adjust the reference frequency of the reference signal 103 so that the reference signal 103 has an adjusted reference frequency. The frequency offset between the adjusted reference frequency and the external reference frequency may be less than the threshold and/or the adjusted reference frequency may be equal to the external reference frequency.

The synchronization circuitry 106 may be configured to vary (or adjust) the reference frequency by an adjustment value based on the frequency offset. The adjustment value may be equal to the frequency offset, a multiple of the frequency offset, or the frequency offset multiplied by a limiting value. For example, the synchronization circuitry 106 may be configured to derive the adjustment value by assigning a sign of the frequency offset (see FIGS. 3A and 3B). Additionally or optionally, the synchronization circuitry 106 may be configured to vary the reference frequency iteratively until (or so that) the frequency of the sensor pixels output signal is below a predetermined threshold.

The synchronization circuitry 106 may include (or may be) a frequency generation circuit (e.g., a modulation clock supply) configured to generate the reference signal based on the sensor pixels output signal 105 (see FIG. 4). The frequency generation circuit may be implemented as an analog or digital circuit. The frequency generation circuit may include a reference oscillator circuit configured to generate the reference signal 103 having an adjusted reference frequency based on the difference between the external modulation frequency and the reference frequency (e.g., based on the frequency offset derived by the synchronization circuitry). The reference oscillator circuit may be a tunable crystal oscillator which may be tunable or configurable by certain electrical parameters which may be derived based on the required frequency offset. The electrical parameters may be set by writing a PLL configuration to one or more registers on the TOF sensor chip via Inter-Integrated Circuit (I2C) communication. Optionally, the frequency generation circuit may include a phase locked loop circuit or a delay locked loop circuit. Thus, the reference signal 103 may be based on or may be a phase-locked reference oscillator signal generated by the reference oscillator circuit. Optionally, the reference oscillator circuit may include or be a voltage controlled oscillator which may be arranged in a separate circuit from the sensor pixel array. The reference oscillator circuit may be arranged so that it is not a part of an imager chip with the sensor pixel array.

The synchronization circuitry 106 may further include a phase shift circuit, which may be connected to the frequency generation circuit. The phase shift circuit may be configured to generate sequentially the plurality of biasing signals having the same frequency as the reference signal, but different phase offsets compared to the reference signal. For example, a first biasing signal may have a first phase offset with respect to the reference signal. A subsequent second biasing signal may have a second (different) phase offset compared to the reference signal and so forth.

The reference signal 103 may be a periodic signal, such as a sinusoidal or a square signal. The reference signal 103 may have the reference frequency, fr, which may lie between 1 MHz to 300 MHz, e.g. between 5 MHz to 100 MHz, e.g. between 5 MHz to 30 MHz. The reference signal 103 may have a frequency greater than 1 MHz, or greater than tens of MHz. For example, the reference signal, fr, may range from about 1 MHz to about 5 MHz or from about 1 MHz to about 10 MHz or from about 1 MHz to about 20 MHz or higher.

The synchronization circuitry 106 may be configured to provide the reference signal 103 (and/or a signal derived from the reference signal 103) to the plurality of sensor pixels 101. The plurality of biasing signals (derived based on the reference signal 103) may be sequentially applied to the pixel sensor array (e.g. to each sensor pixel of a sensor pixel array). The frequency and/or frequencies, fr, of the reference signal 103 and/or plurality of biasing signals, applied to the photogates may be based on or equal to or a multiple of the reference frequency, Fmod, of the adjusted reference signal.

After the synchronization process, (e.g. after the synchronization circuitry 106 has adjusted the reference frequency of the reference signal 103 so that the frequency of the sensor pixels output signal falls below a threshold), the modulation clock supply of the TOF imaging apparatus 101 may be synchronized with the modulation clock supply of an external TOF imaging apparatus which transmitted the constant phase external light signal 102. For example, the adjusted reference frequency of the reference signal 103 may be equal to the external modulation frequency and/or the adjusted reference frequency of the reference signal 103 may differ from the external modulation frequency by less than 10 Hz (or e.g. less than 5 Hz, or e.g. less than 2 Hz, or e.g. zero Hz).

The TOF imaging apparatus 101 may further include control circuitry which may be connected to the pixel circuitry 104. The control circuitry may be configured to control an emitting circuit of the TOF imaging apparatus 101. For example, the control circuitry of the TOF imaging apparatus may control the emitting circuit to transmit a modulated light data signal having the adjusted reference frequency if (or after) the frequency of the sensor pixels output signal falls below the threshold. The modulated light data signal may include information indicating a readiness of the TOF imaging apparatus 101 to receive an external modulated light data signal comprising load data from an external TOF imaging apparatus. The modulated light data signal may be encoded with load data using phase shift keying (PSK) modulation. For example, the modulated light data may be encoded with data having different phase shifts (e.g., 0°, 90°, 180° and 270°). Optionally or alternatively, pulse position modulation or on-off keying modulation may be used instead of PSK modulation. Pulse position modulation and on-off key modulation may also benefit from the synchronization process because they may also suffer from ambiguous phase values if the reference frequency and the external frequency are not synchronized. For example, the framerate of the ToF camera may be about 7300 fps, and it may be desired to transmit as much information as possible per frame. For example, 2 bits per frame (sample) may be transmitted. Optionally, even other modulation schemes which may reach 1 bit per frame and may reduce bitrate may be used. The encoding of the modulated light data signal may be carried out by the phase shift circuit and controlled by the control circuitry.

The TOF imaging apparatus 100 may further be configured to receive an external modulated light data signal (from the second TOF imaging apparatus). Unlike the external light signal received during the synchronization process for adjusting the reference frequency of the reference signal 103, the external modulated light data signal does not necessarily have a constant phase. For example, the external modulated light data signal may be encoded with load data using phase shift keying (PSK) modulation. The pixel circuitry 104 of the TOF imaging apparatus 100 may be configured to generate sensor signals with phase information related to the received external modulated light data signal based at least partially on the reference signal 103 having the adjusted reference frequency. The control circuitry of the TOF imaging apparatus 100 may be configured to derive load data of the external modulated light data signal received by the plurality of sensor pixels 101. The control circuitry may be configured to derive the load data based on the reference signal 103 having the adjusted reference frequency. Since the reference signal 103 having the adjusted reference frequency is synchronized with the external modulation frequency of the received external modulated light data signal, the control circuitry may decode the load data of the external modulated light data signal without ambiguous phase values.

The TOF imaging apparatus 100 may be a TOF camera and may be configured to produce a three-dimensional image of an object (e.g., it may be configured to operate in depth-sensing mode). Optionally, after the synchronization circuitry 106 has adjusted the reference frequency of the reference signal 103 so that the frequency of the sensor pixels output signal falls below a threshold, the control circuitry may be configured to generate the 3D image. The control circuitry of the TOF imaging apparatus 100 may be configured to generate the 3D image of the object and/or to determine distance information between the TOF imaging apparatus 100 and the object.

The emitting circuit may be configured to emit (or transmit) a modulated light signal modulated with the adjusted reference frequency. The emitting circuit of the TOF imaging apparatus 100 may include an infra-red EM wave or visible EM wave emitting circuit. The emitting circuit may include one or more infra-red or visible light emitting diodes. The synchronization circuitry 106 may be coupled to (e.g. connected to) the emitting circuit (e.g. to the light emitting diodes of the emitting circuit) so that light signals transmitted by the TOF imaging apparatus 100 may be pulsed with the adjusted reference frequency. The synchronization circuitry 106 may further be coupled to (e.g. connected to) the plurality of sensor pixels 101. Thus, the reflected modulated light signal may have the same frequency (e.g. the adjusted reference frequency) as the biasing signals applied to the photogates of each sensor pixel.

The modulated light signal emitted by the emitting circuit of the TOF imaging apparatus 100 may be reflected by the object. The emitting circuit may be configured to emit the modulated light signal having 4 different phase shifts (e.g. 0°, 90°, 180° and 270°). For each phase shift, the difference between the first read-out signal and the second read-out signal may be stored as τ(0°), τ(90°), τ(180°) and τ(270°).

In depth sensing mode, the pixel circuitry 104 may be configured to determine a phase offset value between the emitted modulated light signal and the reference signal based on an arctan function of the differential read-out signals. For example, the phase offset value φ may be calculated based on Equation (2).

$$\varphi = \tan^{-1}\frac{\tau(270°) - \tau(90°)}{\tau(0°) - \tau(180°)} \qquad \text{Equation (2)}$$

The control circuitry may be configured to calculate the distance information, which may be proportional to the phase delay between the reflected modulated light signal and the reference signal having the adjusted reference frequency. For example, the distance, d, may be calculated based on Equation (3).

$$d = \frac{c * \varphi}{4\pi f} \quad \text{Equation (3)}$$

The symbol c may be the speed of light and f may be the reference frequency, for example. Thus, the control circuitry may be configured to generate the 3D image based on the received modulated light signal and the reference signal 103 having the adjusted reference frequency.

It may be understood that the differential output may represent the correlation product of the incoming external light signal 102 and the reference signal 103. Thus, it may be understood that the pixel circuitry 104 may be configured to generate the 3D image based on a correlation (e.g. a cross-correlation or an auto-correlation) of the external light signal 102 and the reference signal 103.

The control circuitry may be configured to produce the distance information of one or more points (e.g. only one point, a line of points, or an array of points) of the 3D image. By determining the distance information, the three-dimensional image of the object may be produced. For example, the image produced may be the final image of the object for example, or a pre-final image, which may be used to produce the final image of the object. For example, a plurality, e.g. a sequence, of pre-final images may be used to produce the final image of the object.

The object may be a person, or thing, or scenery to be photographed. For example, the object may be three-dimensional (3D), e.g. the object may have a height, width and depth. The distance information to be determined by the TOF imaging apparatus 100 may be a distance between one or more different locations or one or more points of the surface profile of the object to the apparatus 100. By determining the distance information related to the object, three-dimensional information (e.g. the height, width and depth) about the object may be determined by the apparatus.

The examples do not limit the TOF imaging apparatus 100 to producing a 3D image based on the reference signal having the adjusted reference frequency. The TOF imaging apparatus 100 may produce a 3D image based on its original (e.g., unadjusted) reference signal 103 even without adjusting its reference frequency.

The examples described herein relate to a TOF imaging apparatus 100 (e.g., a TOF camera). TOF cameras may produce depth images, where each pixel may encode the distance between the camera and the sensed scene. This may work by emitting infrared light and measuring the time it takes to travel to the scene and back to the sensor. In the continuous wave approach, pulsed light, Plight, may be emitted by the illumination unit (e.g., emitting circuit) during the capture process. The pixels of the sensor may be supplied with a wave signal Fmod (e.g., a square wave signal), which may have the same frequency as the emitted light pulses. The travel time of the light pulses may cause a phase-shift between the received and emitted signals. A Photonic Mixer Device (PMD) may be located at each pixel and may produces a value related to the phase shift. The phase of the pulses may be shifted for each image to compensate for light intensity variations. Multiple images may then be processed to one depth image. Due to this measurement principle, TOF, the sensors may be capable of emitting phase shifted pulsed light, and the pixels may be capable of precisely measuring these phase differences. The photonic mixture device (or photonic mixing device, PMD) on (or at) each pixel may detect phase differences of the incoming light pulses and its own reference modulation signal. If the systems are synchronized, the sender may encode information by shifting the phase of its emitted light pulses (e.g., by PSK). In depth sensing, the reflected light pulses PLight and Fmod at pixels may have the same frequency as they originate from the same signal source. However, when Time-of-Flight systems communicate, they may be supplied with signals from different sources. There is usually a frequency offset between these modulation signals due to frequency imprecision of the oscillators.

The examples described herein relate to a TOF imaging apparatus 100 which may be configured to tune or adapt its modulation clock to the modulation clock of an external illumination source (and/or second TOF imaging apparatus) transmitting the external light signal 102. This may allow the TOF imaging apparatus 100 to communicate with external systems. For example, if two TOF systems (e.g. the TOF imaging apparatus 100 and an external TOF imaging apparatus) want to communicate, they may need to have the same modulation (e.g. reference) signal, Fmod. The TOF imaging apparatus 100 may be a slave device which adapts its modulation (reference) frequency to the modulation (reference) frequency of the master device (e.g. the second TOF imaging apparatus).

The examples described herein relate to a TOF imaging apparatus 100 (e.g. a TOF 3D imaging system) which may be a transceiver for image sensor-based optical communication. The TOF imaging apparatus may combine depth measurements with optical communication which may enable precise localization of a communication partner. The TOF imaging apparatus may be further used for secured device authentication, augmented reality, or high speed pose tracking.

The examples described herein relate to two systems equipped with TOF sensors (e.g. two TOF imaging apparatuses), which may communicate face to face via a line-of-sight connection. Due to the depth measurement principle, the TOF systems may use phase-shift-keying (PSK) of pulsed light (PLPSK) to transmit data. By using an active illumination unit as emitter, this can be realized without additional hardware. The modulation method may encode 2 bits per symbol and may thus be superior in bandwidth and robustness to other modulation schemes in the image sensor domain. PLPSK may require synchronized modulation signals in both systems. Without synchronization, optical communication between two TOF systems using PSK may be severely impaired and deemed unfeasible. The TOF imaging apparatus 100 may sense and compensate for a frequency difference between these two TOF systems (or cameras). A 100% success rate may be achieved.

The examples described herein relate to a TOF imaging apparatus 100 which may operate an (external) active illumination unit independently without wire connection. For example, there may be no physical connection of the illumination unit and the TOF imaging apparatus 100 (sensor) in normal depth sensing applications. The TOF imaging apparatus 100 may synchronize the depth sensing camera to the illumination unit, which may mitigate design boundaries which exist in other Time-of-Flight devices.

The examples described herein relate to a TOF imaging apparatus 100 which may enable optical communication between two Time-of-Flight cameras. The TOF imaging apparatus may further combine depth sensing systems with optical communication, which may play a part in full location-aware-communication. The TOF imaging apparatus 100 may enable the use of the pixel position of the projected light source and depth measurements to precisely locate the communication partner. This location-awareness in communication may be unprecedented, and may only be achieved with TOF sensors in such miniaturization. The pixels of the TOF cameras may also be sensitive to pulsed light, which may eliminate all background light. Therefore, no further image processing is necessary to extract information from the gathered data.

The examples described herein relate to a TOF imaging apparatus 100 which may avoid having to directly detect the modulation frequency difference on the sensor by evaluating the pixel contents to achieve modulation signal synchronization. The TOF imaging apparatus 100 may avoid using a separate photodetector (e.g. photo diode) to recover the modulation signal of the other camera. The TOF imaging apparatus 100 may avoid additional hardware which may be incompatible with TOF camera systems. Further, the TOF imaging apparatus may allow for handling of multiple communication partners at the same time.

Figure 2:
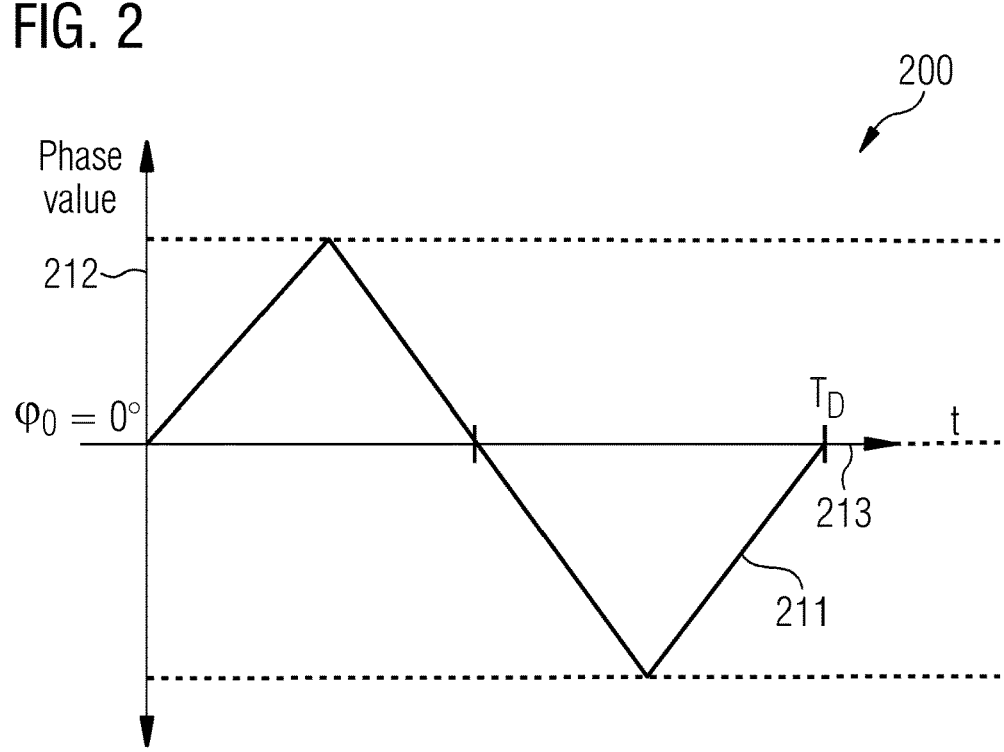
FIG. 2 shows a graphical representation of a sensor pixels output signal.

FIG. 2 shows a representation 200 of a sensor pixels output signal 211 representing a relationship between phase values 212 with respect to time 213.

The representation 200 shows a sensor pixels output signal 211 generated by pixel circuitry of a TOF imaging apparatus (e.g. a slave device) after receiving an external light signal from a further TOF imaging apparatus (e.g. a master device). The sensor pixels output signal 211 shows output values related to a phase offset (e.g. phase values) between the external light signal 102 and the reference signal 103, if the frequencies of the external light signal and the reference signal are not synchronized.

If the sender (master) emits a signal with constant phase, the slave may sense the resulting periodic signal and estimate the frequency difference (offset) ΔF. The representation 200 shows a sensor pixels output signal 211 if a frequency offset between the external modulation frequency and the reference frequency is larger than a threshold (e.g. larger than zero). For example, if the modulation clock of the sender of the external light signal and the modulation clock of the receiving TOF imaging apparatus 100 are not synchronized, the measured phase values change over time. For example, the sensor pixels output signal 211 may be a triangular periodic signal. For example, the frequency of the sensor pixels output signal 211 may be the same (or equal to) the frequency difference (offset) ΔF of the modulation signals (e.g. between the external modulation frequency of the external light signal and the reference frequency of the internal reference signal). The frequency of the sensor pixels output signal 211 may be used to synchronize the system.

More details and aspects are mentioned in connection with the examples described above or below. The examples shown in FIG. 2 may include one or more optional additional features corresponding to one or more aspects mentioned in connection with the proposed concept or one or more examples described above (e.g. FIG. 1) or below (FIGS. 3A to 6).

Figure 3A:
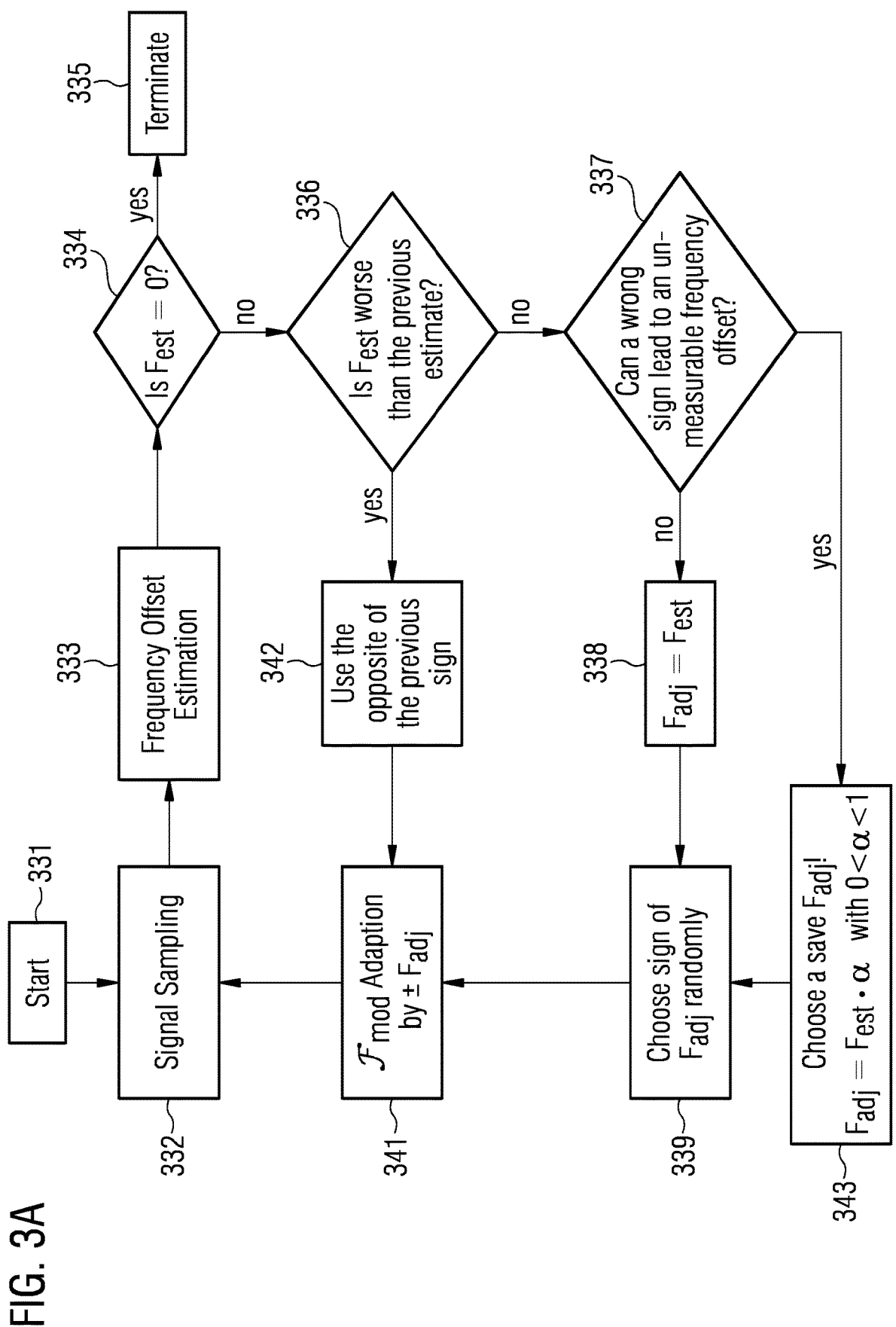
FIG. 3A shows a flow chart of the processes carried out by a TOF imaging apparatus.

FIG. 3A shows a flow chart of the processes which may be carried out by the TOF imaging apparatus 100. For example, FIG. 3A shows a flow chart of the processes which may be carried out by the synchronization circuitry of the TOF imaging apparatus 100. For example, FIG. 3A shows a frequency adaptation (or synchronization procedure) process.

The synchronization circuitry 106 may be configured (in 331) to start a synchronization procedure.

The synchronization circuitry 106 may be configured (in 332) to sample the sensor pixels output signal, O, 105 to determine the frequency of the sensor pixels output signal 105. For example, signal O may be sampled by the slave device.

The synchronization circuitry 106 may be configured (in 333) to carry out frequency offset estimation. For example, the synchronization circuitry 106 may be configured to derive the frequency offset, Fest, related to the difference between the external modulation frequency and the reference frequency based on the frequency of the sensor pixels output signal 105. For example, the frequency of the sensor pixels output signal 105 may be estimated.

The synchronization circuitry 106 may be configured (in 334) to determine if the frequency offset between the external modulation frequency and the reference frequency is less than (or below) a threshold. For example, the synchronization circuitry 106 may be configured to determine if the frequency offset is equal to zero.

The synchronization circuitry 106 may be configured (in 335) to terminate the synchronization procedure if the frequency offset is determined to be below a threshold (or e.g. equal to zero). For example, the synchronization circuitry does not have to adjust the reference frequency of the reference signal.

If the frequency offset is determined to be not below a threshold (e.g. if the estimated frequency offset Fest is not equal to zero), the synchronization circuitry 106 may be configured (in 336) to compare the current estimated frequency offset to a previous estimated frequency offset to determine if the current frequency offset is worse (e.g. larger) than the previous estimated frequency offset, The synchronization circuitry 106 may be configured (in 337) to determine if a wrong sign may lead to an unmeasurable frequency offset if the previous estimated frequency offset is not larger than the previous estimated frequency offset, and/or if there was no previous estimated frequency offset.

The synchronization circuitry 106 may be configured (in 338) to determine an adjustment value, Fadj. The adjustment value, Fadj, may have a magnitude equal to the frequency offset Fest (e.g. Fadj=Fest).

The synchronization circuitry 106 may be configured (in 339) to choose a sign (positive or negative) of the adjustment value Fadj randomly.

The synchronization circuitry 106 may be configured (in 341) to adjust (or adapt) the reference frequency Fmod by the adjustment value (e.g. +Fadj or −Fadj). For example, the reference frequency Fmod of the reference (modulation) signal may be adapted by +Fadj=Fest.

Figure 3B:
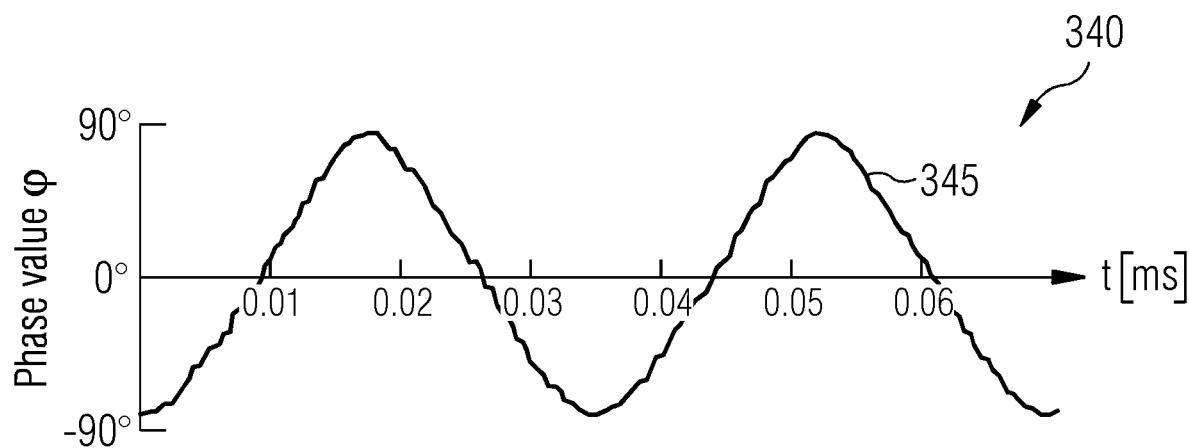
FIG. 3B shows graphical illustrations of at least part of a synchronization process.
Figure 3B:
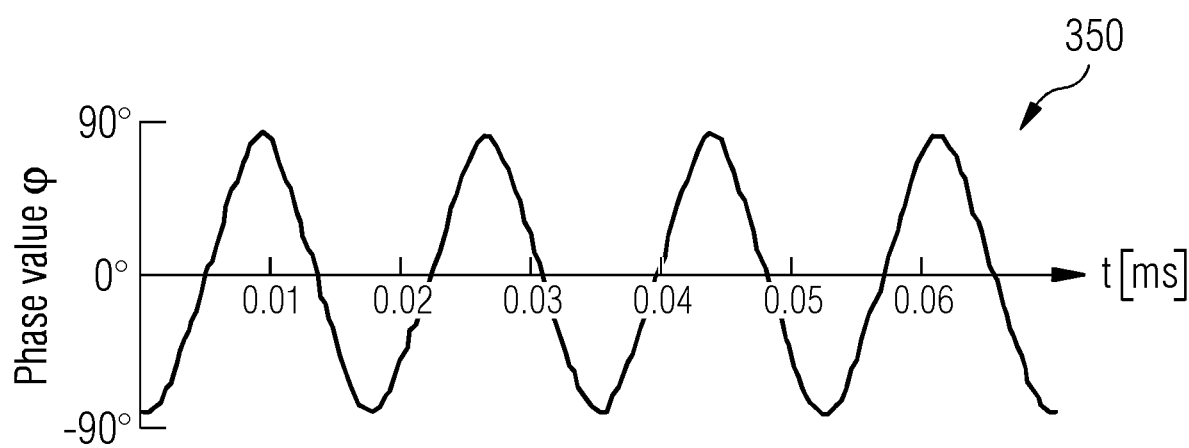
Figure 3B:
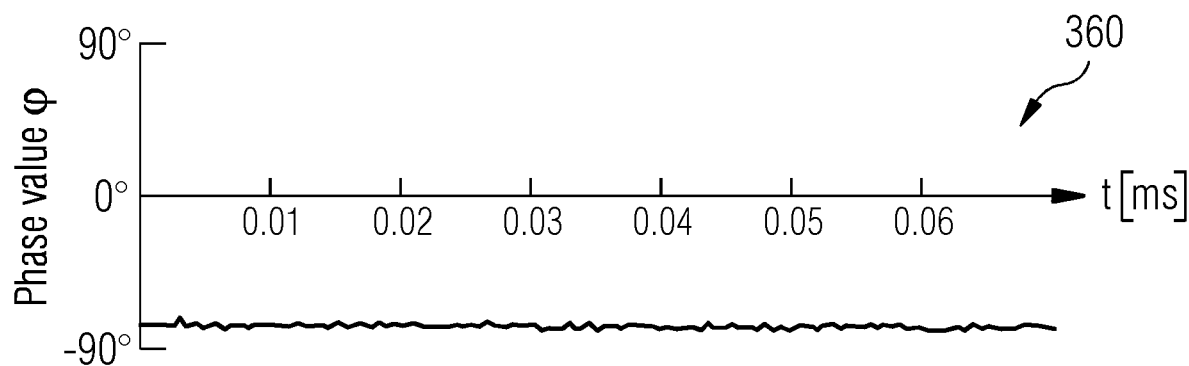

The synchronization circuitry 106 may be configured (in 342) to determine an adjustment value, Fadj, if the current estimated frequency offset is larger than the previous estimated frequency offset. The adjustment value, Fadj, may have a magnitude equal to the new frequency offset, Fest. The adjustment value, Fadj, may have an opposite sign to the previous sign to the adjustment value (See. FIG. 3B)

The synchronization circuitry 106 may be configured (in 342) to determine an adjustment value if it is determined (in 337) that a wrong sign may lead to an unmeasurable frequency offset. The adjustment value, Fadj, may have a magnitude equal to the estimated frequency offset multiplied by a limiting value a (e.g. Fadj=Fest×α if 0<α<1).

The synchronization circuitry 106 may be configured to vary the reference frequency iteratively until the frequency of the sensor pixels output signal is below a predetermined threshold.

The synchronization approach (or processes) may be based on capturing the sensor pixels output signal and estimating the frequency. The estimated frequency may then be used to adapt the frequency generation circuit (e.g., the phase locked loop PLL) in the Time-of-Flight sensor, which may lead to adjusting the modulation frequency of the TOF imaging apparatus (the slave device).

The adaption procedure may be iterative, because it may not be possible to guess the frequency difference precisely enough at the first attempt. It may also be uncertain, if the frequency difference is positive or negative, and therefore the procedure guesses the sign of the adapted frequency at first, but may detect if the adaption was wrong in the next iteration.

FIG. 3B shows graphical illustrations (340, 350, 360) of at least part of the synchronization process carried out by the synchronization circuitry (e.g. the synchronization on a recorded dataset).

Illustration 340 shows an initial sensor pixels output signal (or phase offset signal O). In 340 (and as described in 332), the signal 345 (e.g. the sensor pixels output signal) may be sampled for a brief time, and ΔF (or Fest) is estimated to be 30.82 Hz.

A positive sign may be randomly chosen, and the phase locked loop of the synchronization circuitry may be adapted by this value Fest (+30.82 Hz).

In the subsequent iteration, the signal (the sensor pixels output signal) may be (iteratively) sampled again (in 350). This time, the estimated frequency difference may be 60.62 Hz, which means that the previous sign was wrong. For example, the new sensor pixels output signal (new phase offset signal) may have a larger frequency than the previous initial sensor pixels output signal. This time, the synchronization circuitry may be configured to adapt the frequency by −60.62 Hz using the opposite of the previous sign. For example, since a positive sign was chosen in the previous iteration, a negative sign is chosen in the current iteration).

In 360, the frequency offset ΔF is determined to be sufficiently small (e.g. the frequency of the sensor pixels output signal falls below a threshold) and thus no periodic signal can be determined.

The synchronization circuitry may be implemented in software. The TOF camera may be controlled by Inter-Integrated Circuit (I2C) commands. These commands may cause the TOF sensor to change its modulation frequency via its internal PLL.

More details and aspects are mentioned in connection with the examples described above or below. The examples shown in FIGS. 3A and 3B may each include one or more optional additional features corresponding to one or more aspects mentioned in connection with the proposed concept or one or more examples described above (e.g. FIGS. 1 to 2) or below (FIGS. 4A to 6).

Figure 4A:
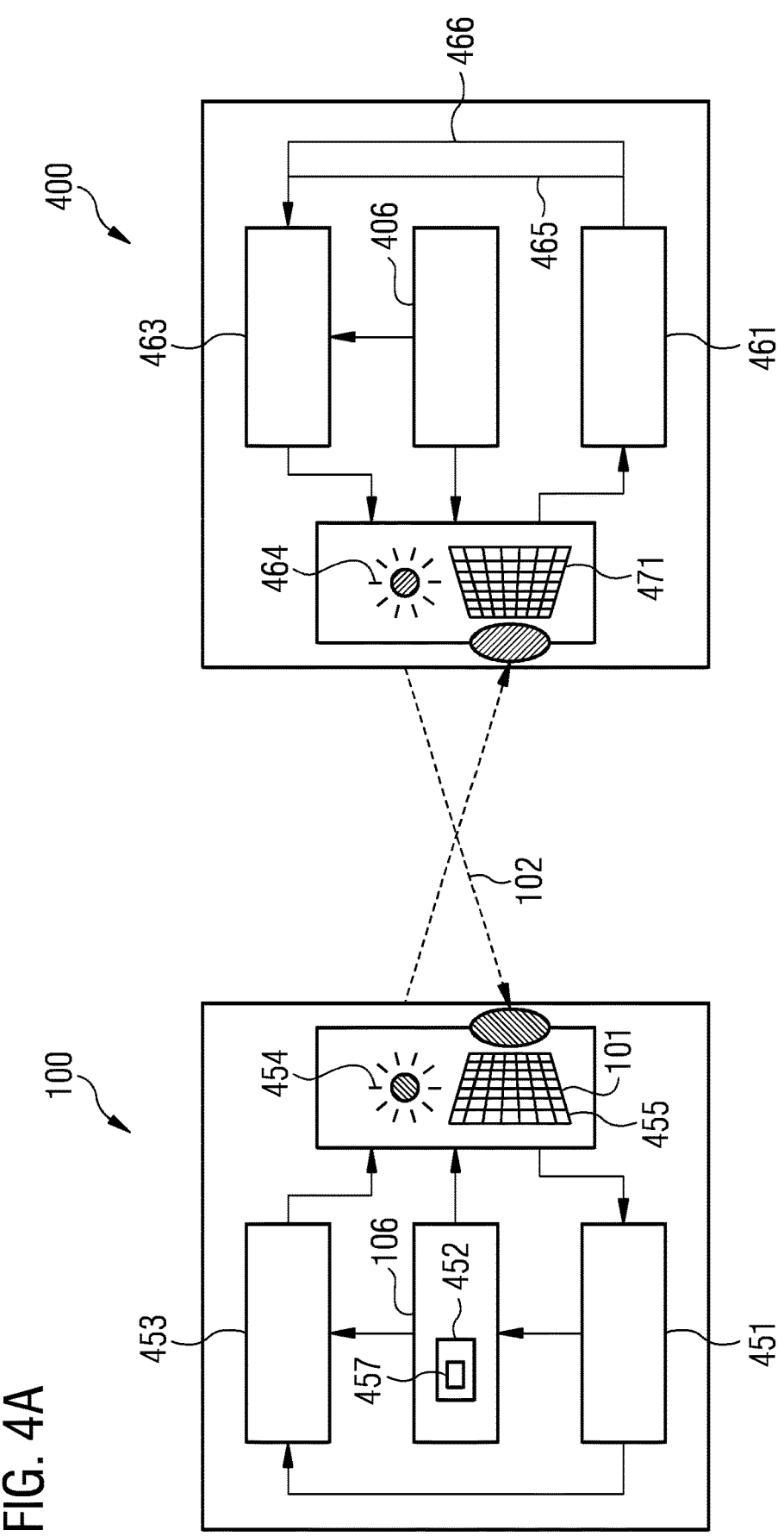
FIG. 4A shows a schematic illustration of a first TOF imaging apparatus and a second TOF imaging apparatus.

FIG. 4A shows a schematic illustration of a first TOF imaging apparatus 100 and a second TOF imaging apparatus 400. For example, FIG. 4A shows a principle of optical communication based on Time-of-Flight.

The first TOF imaging apparatus 100 (e.g. a slave device) includes a sensor circuit 455 which may include the plurality of sensor pixels 101. The sensor circuit 455 may be configured to receive the external light signal 102 modulated with the external modulation frequency. The first TOF imaging apparatus 100 (the slave device) may be configured to receive the external light signal 102 from an external (or second) TOF imaging apparatus 400 (e.g. a master device).

The first TOF imaging apparatus 100 further includes pixel circuitry. At least part of the pixel circuitry may be located within the sensor circuit 455. Additionally, optionally or alternatively, at least part of the pixel circuitry of the first TOF imaging apparatus 100 may be connected to or may be part of a processing system 451 of the first TOF imaging apparatus 100.

The first TOF imaging apparatus 100 may further include synchronization circuitry 106 (e.g. a modulation clock supply) configured to adjust the reference frequency of the reference signal 103 based on the sensor pixels output signal 105. The synchronization circuitry 106 may include a phase locked loop circuit 452 configured to generate the reference signal, Fmod. The phase locked loop circuit 452 may include a reference oscillator circuit 457 configured to generate the reference signal 103.

The synchronization circuitry 106 may further include a phase shift circuit 453 (e.g. a phase shifting unit PSU), which may be connected to the phase locked loop circuit 452, or which may be implemented as part of the phase locked loop 452. The phase shift circuit 453 may receive the reference signal Fmod and may generate a plurality of biasing signals based on the reference signal Fmod.

The first TOF imaging apparatus 100 may further include a processing system or circuit 451. The processing system 451 may include or may be connected to pixel circuitry and control circuitry. The processing system 451 (e.g. the control circuitry) may be configured to control an emitting circuit of the TOF imaging apparatus 101. The processing system 451 may be connected to the phase shift circuit 453 and may control a transmission of information by phase shift keying (PSK). For example, the control circuitry of the processing system 451 may control the transmission of light pulses (Plight) by the emitting circuit 454 having a constant phase or different phase shifts. The processing system (e.g. the pixel circuitry of the processing system) may be connected to the synchronization circuitry 106. The processing system may transmit information to the synchronization circuitry 106 for adapting to synchronize the reference signal, Fmod.

The second (external) TOF imaging apparatus 400 (e.g. a master device) may be similar (or identical) to the first TOF imaging apparatus 100. For example, the second TOF imaging apparatus 400 may include an emitting circuit 464, a sensor circuit 471 comprising a plurality of sensor pixels, synchronization circuitry 406 (e.g. a modulation clock supply), a phase shift circuit 463 (e.g. a phase shifting unit), and a processing system 461 (e.g. comprising pixel circuitry and control circuitry).

The second TOF imaging apparatus 400 may be configured to send a constant phase signal to the first TOF imaging apparatus 100. For example, the processing system may control the phase shifting unit 463 to set the phase shift to 0° during (or e.g., throughout) the synchronization process. The phase shifting unit 463 may be configured to send a light signal having a constant 0° phase shift during (or e.g., throughout) the synchronization. The processing system 461 may further control the phase shifting unit 463 to transmit information by PSK. Additionally, alternatively or optionally, the second TOF imaging apparatus 400 may lack (or may not have) the synchronization circuitry of the first TOF imaging apparatus 100. For example, the first TOF imaging apparatus 100 may be able to adapt or adjust its internal reference signal to the reference signal of the second TOF imaging apparatus 400, even if the second TOF imaging apparatus 400 is unable to adapt or adjust its own internal reference signal.

As shown in FIG. 4A, two TOF cameras (100, 400) may communicate by phase-shift-keying. For example, they may transmit modulate light data signals having different phase shifts (e.g. 0°, 90°, 180° and 270°). They may use their built-in phase shifting unit for modulation. The phase shift may be demodulated at each pixel, e.g. after the slave device system has synchronized its modulation signal Fmod to the master device system.

A distance between the first TOF imaging apparatus 100 and the second TOF imaging apparatus 400 may be less than 15 m. The first TOF imaging apparatus 100 and the second TOF imaging apparatus 400 may be configured with MiraCE sensor hardware.

Figure 4B:
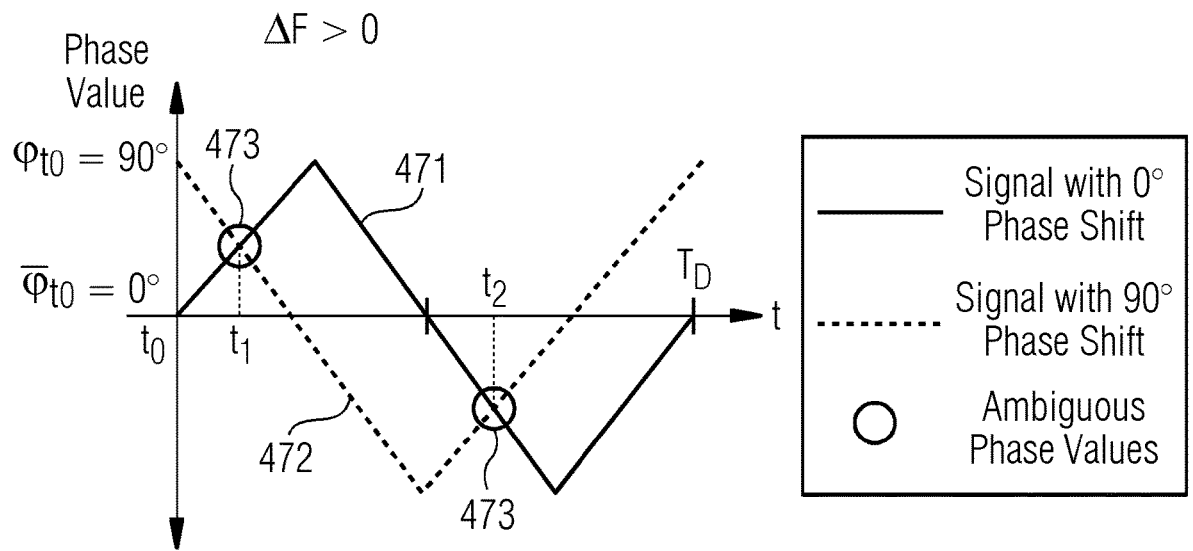
FIG. 4B shows an illustration of the presence of ambiguous phase values.

FIG. 4B shows the presence of ambiguous phase values if the reference frequency of the first TOF imaging apparatus 100 is not synchronized with the reference frequency of the second TOF imaging apparatus 400.

If there is a frequency difference between the reference frequency of the first TOF imaging apparatus 100 and the reference frequency of the second TOF imaging apparatus 400 (e.g. ΔF>0, or e.g. ΔF>a threshold), the phases between the modulation signals change over time. Line 471 shows a data signal with 0° phase shift. Line 472 shows a data signal with 90° phase shift. This leads to ambiguous phase values 473 (circles) which directly leads to faults during communication.

Figure 4C:
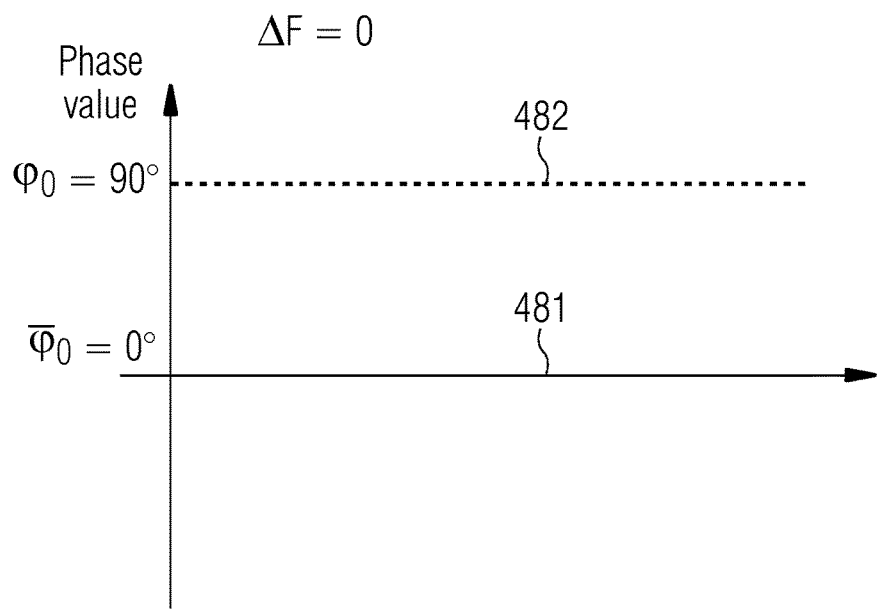
FIG. 4C shows an illustration of the absence of ambiguous phase values.

FIG. 4C shows the absence of ambiguous phase values if the reference frequency of the first TOF imaging apparatus 100 is synchronized with the reference frequency of the second TOF imaging apparatus 400.

Line 481 shows a data signal with 0° phase shift. Line 482 shows a data signal with 90° phase shift. If the frequencies of the modulation (reference) signals are identical or below a threshold (e.g. ΔF=0), different phases produce different outputs, and the number of ambiguous phase values may be reduced or eliminated.

Figure 4D:
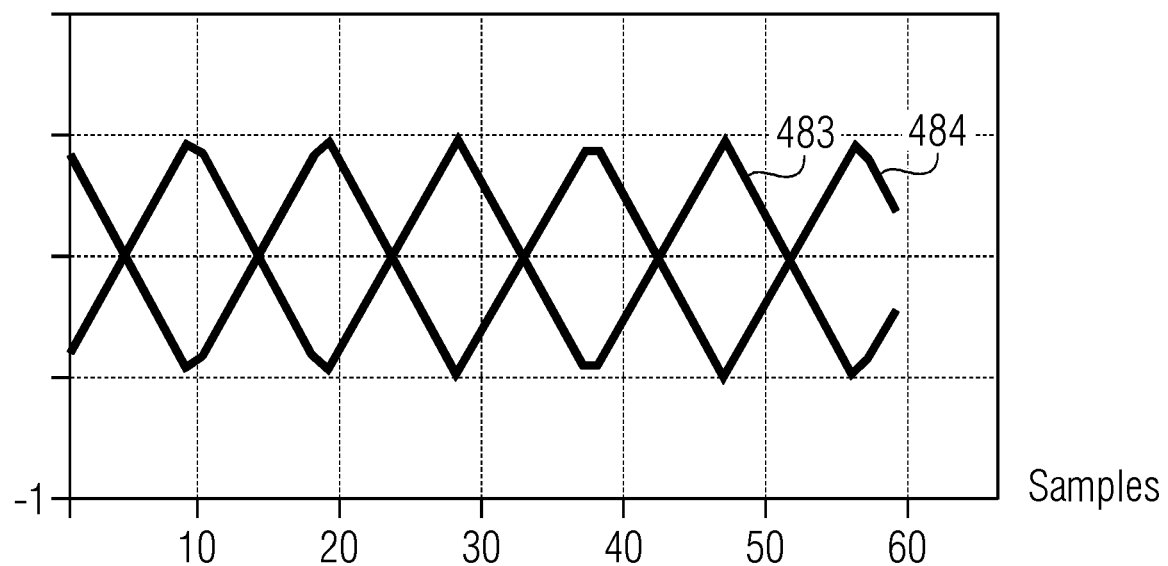
FIG. 4D shows a graphical illustration of a sensor pixels output signal if an external light signal with a 0° or 180° phase shift is received.

FIG. 4D shows a graphical illustration of possible sensor pixels output signals if an external light signal with a 0° or 180° phase shift is received from the master device.

Line 483 shows a sensor pixels output signal if the external light signal has a constant 0° phase shift. Line 484 shows a sensor pixels output signal if the external light signal has a constant 180° phase shift.

Figure 4E:
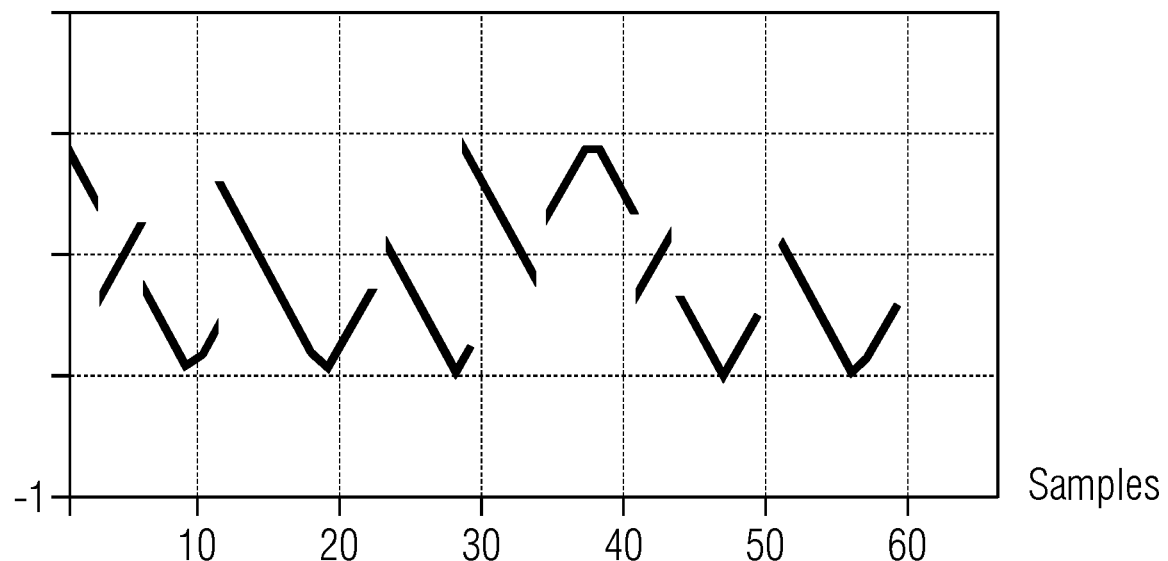
FIG. 4E shows a graphical illustration of a sensor pixels output signal if an external light signal with a random phase shift is received.

FIG. 4E shows a graphical illustration of a sensor pixels output signal S(x) if an external light signal with random phase shifts is received from the master device, such as if the master device transmits an external light signal with phase shifts changing between 0° and 180°.

The following describes an example of how the pixel circuitry 104 may extract the frequency difference F from a master device which emits multiple phase values.

By using a parameterized periodic function such as a sine wave in the following form: $f(x)=c*sin(2\pi*a*x+b)$, the pixel circuitry 104 of the TOF imaging apparatus 100 may determine parameter a, which is proportional with the frequency of the phase offset signal. The pixel circuitry 104 of the TOF imaging apparatus 100 may minimize E in the following term, where: $E=sum(abs(sin(2\pi*a*x+b))-S(x))$ for all samples from 1 to x.

Parameter b may be set to values 0 and $\pi$, corresponding to the 0° and 180° phase shift in the external light signal. Parameter c may be the maximum raw value of the signal which may be derived by using the maximum sample in Signal S. Parameter a may be the desired outcome and found by using a numeric approximation algorithm. The frequency difference in Hz between the master and the slave may be derived by $f=a/(2*\pi)$.

More details and aspects are mentioned in connection with the examples described above or below. The examples shown in FIGS. 4A to 4E may each include one or more optional additional features corresponding to one or more aspects mentioned in connection with the proposed concept or one or more examples described above (e.g. FIGS. 1 to 3B) or below (FIGS. 5 to 6).

Figure 5:
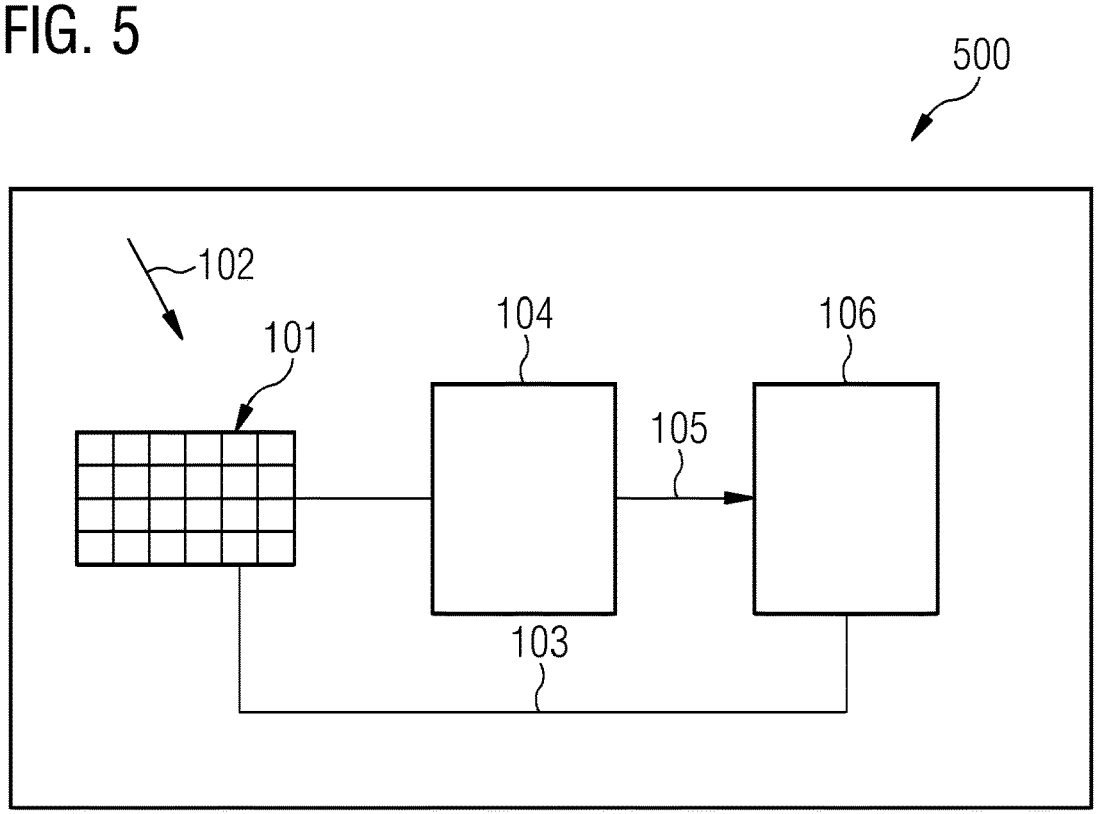
FIG. 5 shows a schematic illustration of a further Time of Flight apparatus.
Figure 6:
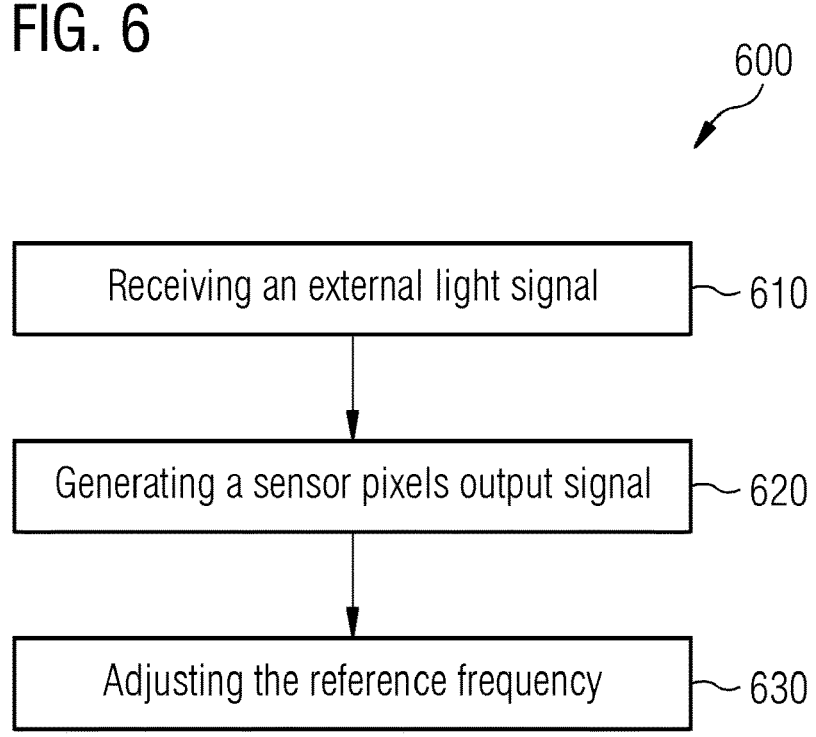
FIG. 6 shows a flow chart of a method for adjusting a reference frequency.

FIG. 5 shows a schematic illustration of a time of flight imaging apparatus 500.

The time of flight imaging apparatus 500 includes at least one sensor pixel 101 configured to receive a modulated light signal 102.

The time of flight imaging apparatus 500 further includes pixel circuitry 104 configured to generate a sensor pixels output signal 105 based on a demodulation of the modulated light signal 102 utilizing a reference signal 103.

The time of flight imaging apparatus 500 further includes synchronization circuitry 106 configured to generate the reference signal 103 having an adjusted reference frequency based on the sensor pixels output signal 105.

Due to the time of flight (TOF) imaging apparatus 500 comprising synchronization circuitry 106 configured to generate the reference signal 103 having an adjusted reference frequency, the TOF imaging apparatus 500 may adjust or adapt its own reference frequency to the external modulation frequency of a signal from an external device. This may lead to communication (e.g. the transfer of load data) between the TOF imaging apparatus 500 and an external device being more accurate due to improved synchronization between the reference frequency of the TOF imaging apparatus 500 and the external modulation frequency. Load data information in data signals received by the TOF imaging apparatus 500 may thus be decoded more accurately by the TOF imaging apparatus 500 as the number of ambiguous phase values during decoding may be reduced.

The TOF imaging apparatus 500 may include one or more or all of the features of the imaging apparatus 100. For example, the TOF imaging apparatus 500 includes pixel circuitry 104 configured to generate the sensor pixels output signal 105. The pixel circuitry 104 may be configured to generate the sensor pixels output signal 105 on a demodulation of the modulated light signal 102 utilizing the reference signal 103 to derive (or extract) phase information (or phase offset) information related to the modulated light signal 102 and the reference signal 103.

More details and aspects are mentioned in connection with the examples described above or below. The examples shown in FIG. 5 may include one or more optional additional features corresponding to one or more aspects mentioned in connection with the proposed concept or one or more examples described above (e.g. FIGS. 1 to 4C) or below (FIG. 6).

FIG. 6 shows a flow chart of a method 700 for adjusting a reference frequency.

The method 600 includes receiving (in 610), by a plurality of sensor pixels, an external light signal modulated with an external modulation frequency.

The method further includes generating (in 620), by pixel circuitry, a sensor pixels output signal based on the external light signal and a reference signal having a reference frequency, wherein the sensor pixels output signal has a frequency depending on a difference between the external modulation frequency and the reference frequency.

The method further includes adjusting (in 630), by synchronization circuitry, the reference frequency of the reference signal based on the sensor pixels output signal.

Due to the adjusting of the reference frequency of the reference signal based on the sensor pixels output signal, a reference frequency (e.g. of a TOF imaging apparatus) may be adapted to the external modulation frequency of the external light signal. This may lead to communication (e.g. the transfer of load data) between the TOF imaging apparatus and an external device being more accurate due to improved synchronization between the reference frequency of the TOF imaging apparatus and the external modulation frequency. Load data information in data signals received by the TOF imaging apparatus may thus be decoded more accurately by the TOF imaging apparatus as the number of ambiguous phase values during decoding may be reduced.

The method 600 may be carried out by a TOF imaging apparatus.

The external light signal may be a light signal emitted by an external light source. For example, the TOF imaging apparatus may be configured to receive the external light signal from the external light source via air or through optical fiber. For example, the external light source may be electrically isolated from the TOF imaging apparatus, and/or no additional electrical signals may be transferred between them. For example, there may be no wired (or cable) connections between the external light source and the TOF imaging apparatus.

Additionally, alternatively or optionally, the external light signal may be a light signal emitted by the external light source and reflected by an object. For example, the external light source (e.g. an illumination unit) and a TOF imaging apparatus may face the same direction (e.g. face a scene or an object) and may operate in depth sensing mode. Even if there is no cable connection connecting the external light source to the TOF imaging apparatus, the TOF sensor may use the light emitted from the external light source and reflected by a scene (or object) to synchronize the reference frequency of its own reference (modulation) signal to the frequency of the external light source.

Additionally, alternatively or optionally, the external light signal may be a light signal emitted by an external time of flight imaging apparatus. For example, the external TOF imaging apparatus may be electrically isolated from the TOF imaging apparatus, and/or no additional electrical signals may be transferred between them. For example, there may be no wired (or cable) connections between the external TOF imaging apparatus and the TOF imaging apparatus. The TOF imaging apparatus may synchronize its internal reference frequency with the reference frequency of the external TOF imaging apparatus.

The method 600 may further include receiving an external modulated light data signal comprising load data by the plurality of sensor pixels after adjusting the reference frequency so that the frequency of the sensor pixels output signal falls below a threshold.

The method 600 may further include deriving load data of the external modulated light data signal received after adjusting the reference frequency of the reference signal. For example, the load data of the external modulated light data signal may be derived after a frequency of the sensor pixels output signal falls below a threshold. The load data of the external modulated light signal may be derived based on the reference signal having the adjusted reference frequency and the external modulated light signal.

The method 600 may further include generating a three-dimensional image of an object and/or determining distance information between a TOF imaging apparatus and an object based on a modulated light signal having the adjusted reference frequency. For example, generating the three-dimensional image of the object and/or determining the distance information may include emitting a modulated light signal having the adjusted reference frequency and receiving a reflected modulated light signal having the adjusted reference frequency.

More details and aspects are mentioned in connection with the examples described above or below. The examples shown in FIG. 6 may include one or more optional additional features corresponding to one or more aspects mentioned in connection with the proposed concept or one or more examples described above (e.g. FIGS. 1 to 5) or below.

Various examples relate to modulation signal synchronization for time of flight sensors. The examples may use a procedure to synchronize the modulation signals of two TOF cameras (A and B). A pulsed light signal may be emitted by TOF camera A and received by TOF camera B. The signal may be analyzed by the processing system of TOF camera B, and the frequency difference between the modulation signals of TOF camera A and TOF camera B may be determined. This information may be used to adapt the frequency of the modulation signal in TOF camera B for synchronization.

The aspects and features (e.g. the TOF imaging apparatus, the plurality of sensor pixels, the external light signal, the pixel circuitry, the reference signal, the sensor pixels output signal, the synchronization circuitry, the further TOF imaging apparatus, the phase locked loop, the reference oscillator circuit, the control circuitry) mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may include or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A time of flight imaging apparatus, comprising:
   a plurality of sensor pixels configured to receive an external light signal modulated with an external modulation frequency;
   pixel circuitry configured to generate a sensor pixels output signal based on the external light signal and a reference signal having a reference frequency, wherein the sensor pixels output signal has a frequency depending on a difference between the external modulation frequency and the reference frequency; and
   synchronization circuitry configured to adjust the reference frequency of the reference signal based on the sensor pixels output signal.

2. The time of flight imaging apparatus according to claim 1, wherein the sensor pixels output signal comprises output values related to a phase offset between the external light signal and the reference signal.

3. The time of flight imaging apparatus according to claim 1, wherein the synchronization circuitry is configured to adjust the reference frequency of the reference signal so that the frequency of the sensor pixels output signal falls below a threshold.

4. The time of flight imaging apparatus according to claim 3, wherein the synchronization circuitry is configured to vary the reference frequency iteratively until the frequency of the sensor pixels output signal is below the threshold.

5. The time of flight imaging apparatus according to claim 3, further comprising:
   an emitting circuit configured to transmit a modulated light data signal; and
   control circuitry configured to control the emitting circuit to transmit the modulated light data signal having the adjusted reference frequency in response to the frequency of the sensor pixels output signal falling below the threshold.

6. The time of flight imaging apparatus according to claim 1, wherein the synchronization circuitry is configured to derive a frequency offset related to the difference between the external modulation frequency and the reference frequency based on the frequency of the sensor pixels output signal.

7. The time of flight imaging apparatus according to claim 6, wherein the synchronization circuitry is configured adjust the reference frequency of the reference signal based on the frequency offset.

8. The time of flight imaging apparatus according to claim 1, wherein the external light signal is a fixed phase signal.

9. The time of flight imaging apparatus according claim 1, wherein the pixel circuitry is configured to derive the sensor pixels output signal based on phase information derived from a sub-group of sensor pixels of the plurality of sensor pixels.

10. The time of flight imaging apparatus according to claim 9, wherein the sub-group of sensor pixels is a two-dimensional array of sensor pixels comprising less than 50% of a total number of sensor pixels of the plurality of sensor pixels.

11. The time of flight imaging apparatus according to claim 9, wherein the sub-group of sensor pixels are sensor pixels among the plurality of sensor pixels receiving a highest light intensity from the external light signal.

12. The time of flight imaging apparatus according to claim 1, wherein each sensor pixel of the plurality of sensor pixels comprises at least part of a photonic mixing device circuit.

13. The time of flight imaging apparatus according to claim 1, wherein the pixel circuitry is configured to generate the sensor pixels output signal based on a demodulation of the modulated light signal utilizing the reference signal by at least one sensor pixel of the plurality of sensor pixels.

14. The time of flight imaging apparatus according to claim 1, wherein the synchronization circuitry comprises a phase locked loop circuit,
wherein the phase locked loop circuit comprises a reference oscillator circuit configured to generate the reference signal having an adjusted reference frequency based on the difference between the external modulation frequency and the reference frequency.

15. The time of flight imaging apparatus according to claim 1, further comprising:
an emitting circuit configured to transmit a modulated light data signal; and
control circuitry configured to control the emitting circuit to transmit the modulated light data signal having the adjusted reference frequency based on the frequency of the sensor pixels output signal falling below a threshold.

16. The time of flight imaging apparatus according to claim 1, further comprising:
control circuitry configured to derive load data of an external modulated light data signal received by the plurality of sensor pixels, wherein the control circuitry is configured to derive the load data based on the reference signal having the adjusted reference frequency.

17. The time of flight imaging apparatus according to claim 1, further comprising:
an emitting circuit configured to transmit a modulated light signal modulated with the adjusted reference frequency; and
control circuitry configured to generate a three-dimensional image of an object, wherein the control circuitry is configured to generate the three-dimensional image based on the modulated light signal emitted by the emitting circuit.

18. A time of flight imaging apparatus, comprising:
at least one sensor pixel configured to receive a modulated light signal;
pixel circuitry configured to generate a sensor pixels output signal based on a demodulation of the modulated light signal utilizing a reference signal; and
synchronization circuitry configured to generate the reference signal having an adjusted reference frequency based on the sensor pixels output signal.

19. A method for adjusting a reference frequency, the method comprising:
receiving, by a plurality of sensor pixels, an external light signal modulated with an external modulation frequency;
generating, by pixel circuitry, a sensor pixels output signal based on the external light signal and a reference signal having a reference frequency, wherein the sensor pixels output signal has a frequency depending on a difference between the external modulation frequency and the reference frequency; and
adjusting, by synchronization circuitry, the reference frequency of the reference signal based on the sensor pixels output signal.

20. The method according to claim 19, wherein the external light signal is at least one of a light signal emitted by an external light source, a light signal emitted by an external time of flight imaging apparatus, or a light signal emitted by an external light source and reflected by an object.

* * * * *